A. M. STANLEY.
METHOD OF MAKING VEHICLE WHEELS.
APPLICATION FILED MAY 6, 1915. RENEWED JAN. 7, 1916.
1,196,894.
Patented Sept. 5, 1916.
2 SHEETS—SHEET 1.
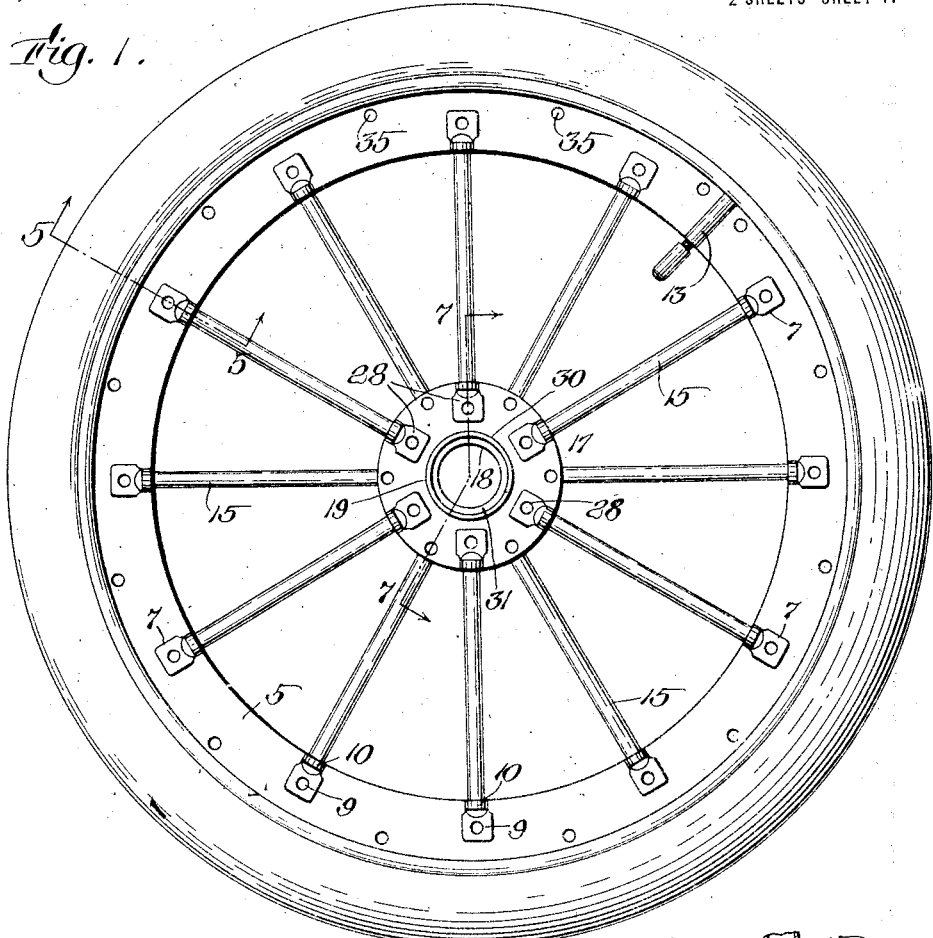
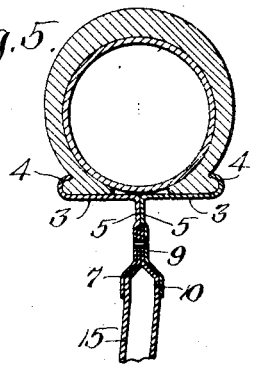
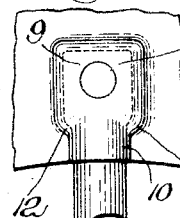
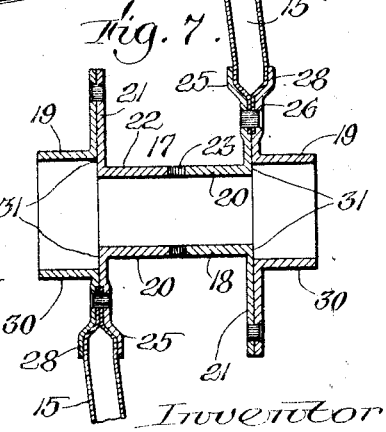
Inventor:
Arthur M. Stanley
by his attorneys
Phillips, Van Ormer & Fish

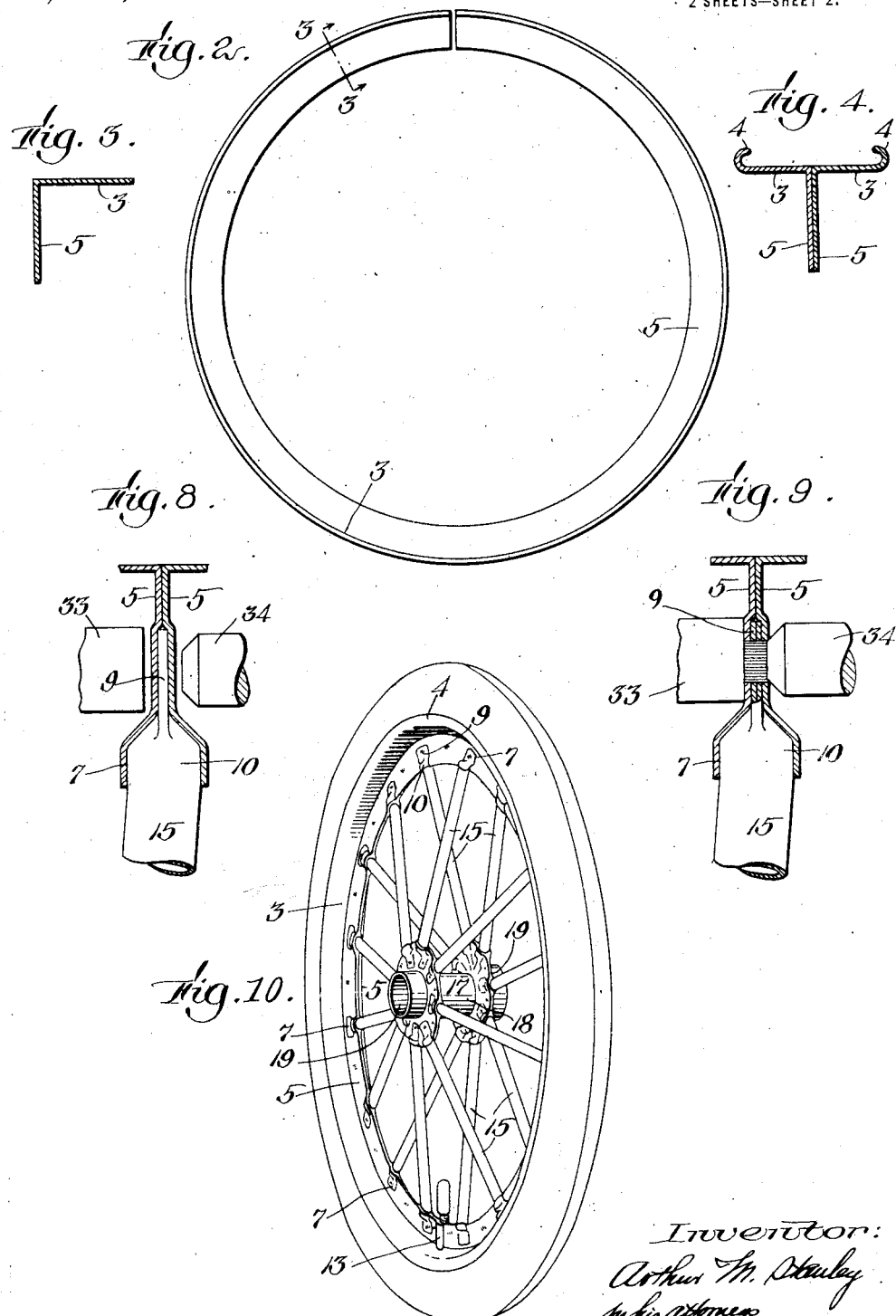

UNITED STATES PATENT OFFICE.

ARTHUR M. STANLEY, OF LYNN, MASSACHUSETTS, ASSIGNOR TO WARREN K. BLODGETT, OF CAMBRIDGE, MASSACHUSETTS.

METHOD OF MAKING VEHICLE-WHEELS.

1,196,894.  Specification of Letters Patent.  Patented Sept. 5, 1916.

Application filed May 6, 1915, Serial No. 26,226. Renewed January 7, 1916. Serial No. 70,889.

*To all whom it may concern:*

Be it known that I, ARTHUR M. STANLEY, a citizen of the United States, residing at Lynn, in the county of Essex and State of Massachusetts, have invented certain new and useful Improvements in Methods of Making Vehicle-Wheels; and I do hereby declare the following to be a full, clear, and exact description of the invention, such as will enable others skilled in the art to which it appertains to make and use the same.

The present invention relates to a method of making metal vehicle wheels and more particularly to a method of making metal wheels in which the several component parts of the wheel are welded together to form an integral structure.

The object of the invention is to provide an improved method of making metal wheels of this character which may be practised cheaply to produce a finished wheel of minimum weight and of the required strength.

In the drawings illustrating the several steps in the method: Figure 1 is a side elevation of the completed wheel with a tire applied thereto; Fig. 2 is a view of one of the rim sections bent into circular shape preparatory to being butt welded; Fig. 3 is a view showing a cross section of a rim section taken upon the line 3—3 of Fig. 2; Fig. 4 is a view showing a cross section of the completed rim formed by two rim sections; Fig. 5 is a view showing a cross section on the line 5—5 of Fig. 1 and illustrating the method of securing the rim sections and spokes together; Fig. 6 is a detail showing a side elevation of the rim with the end of a spoke secured therein; Fig. 7 is a view showing a section upon the line 7—7 of Fig. 1, and illustrating the method of forming the hub and securing the spokes thereto; Fig. 8 is a view illustrating the method of welding the flanges to one another and to the end of the spoke; Fig. 9 is a view similar to Fig. 8, illustrating the manner in which the welded area extends through the flanges and flattened end of the spoke; and Fig. 10 is an elevation of the completed wheel showing the manner in which alternate spokes are secured to opposite ends of the hub.

In the preferred method as shown in the illustrated embodiment of the invention the several component parts of the wheel are first formed into the proper shape, after which the several parts are assembled in successive stages to gradually build up the completed wheel.

The rim portion of the wheel is preferably built up of two pieces 3 each consisting of a steel ring of L-shaped cross section. Each ring is formed by bending a straight angle iron into a substantially circular shape, as shown in Fig. 2, and butt welding the adjacent faces of the ring to form an integral L-shaped ring. In addition, each ring is provided with a curved flange 4 to receive the bead of a clencher tire, and this operation may conveniently be performed by drawing out the flange with suitable dies. The flanges 5 of the rings are also provided with a series of depressions 7 which coöperate with one another when the rim is assembled to form pockets for receiving the ends of the spokes. The pockets are preferably formed with comparatively narrow or flat end portions 9 for the reception of the flattened ends of the spokes and with rounded or cylindrical mouth portions 10 for the reception of a short length of the round shanks of the spokes. The shoulders 12 which are thereby formed on the sides of the pockets at the junction of the flat and cylindrical portions serve to positively lock the flattened ends of the spokes in the pockets when the rim and spokes are secured together. To provide for the reception of the valve stem in the flanges semi-cylindrical recesses 13 are pressed in the flanges, as shown clearly in Fig. 1.

Each spoke 15 is formed of a steel tube cut to the proper length and having its opposite ends drawn out by suitable dies to form flattened end portions which are received in pockets formed in the flanges of the hub and rim, as shown clearly in the drawing.

The hub portion of the wheel indicated at 17 comprises a central barrel portion 18 and coöperating end pieces 19. The central barrel consists of two pressed steel rings 20 having outwardly extending radial flanges 21 and tubular shank portions 22 which are butt welded at 23 to form the completed barrel 18. Each of the flanges 21 has a series of depressions 25 formed therein similar to the depressions upon the rim flanges. Each end piece 19 consists of a pressed steel ring having an outwardly extending flange 26 provided with depressions 28 to coöperate with the depressions upon the flanges 21 to form pockets for the reception of the flattened inner ends of the spokes. In order to provide for the reception of the wheel bearings without the necessity of machining the interior of the hub or the insertion of bearing sleeves, the tubular shank 18 of the barrel is made smaller in diameter than the tubular shanks 30 of the end pieces, as shown clearly in Fig. 7, thus providing shoulders 31 for supporting the bearings within the end pieces. From an inspection of the drawings it will be noted that the depressions in the flanges of the hub are so arranged with relation to one another that the pockets formed upon opposite ends of the hub are offset to enable the spokes to be alternately secured to opposite ends of the hub.

In assembling the various component parts of the wheel the inner flattened ends of the spokes are first inserted between the flanges of the hub which are assembled in the proper relation to one another. The flanges are then welded to one another and to the spokes by welded regions extending through the metal of the flanges and the flattened ends of the spokes, as shown clearly in Fig. 7 of the drawings. This operation is conveniently performed by providing a pair of oppositely disposed welding electrodes 33 and 34 which engage with opposite sides of the flanges with sufficient pressure to form an integral joint between the flanges and end of the spoke after the metal has been heated sufficiently to flow. The flowing of the metal is caused by passing an electric current for a predetermined length of time through the portions to be welded and cutting off the current when a predetermined temperature of the metal has been reached. The inner ends of the spokes are welded to the hub in successive stages, a pair of spokes being simultaneously welded at each stage. When the welding operation has been completed the several component parts of the hub are integrally connected with one another and with the ends of the spokes and it will be noted that owing to the fact that a short length of the round portion of the spoke is received between the flanges the weakest portion of the spoke or that portion at which the round shank merges into the flattened end is reinforced by the flanged portions of the hub. Furthermore, the shoulders formed by the junction of the flat end portions of the pockets with the round mouth portions serve to lock the spokes firmly in the flanges. After the hub and spokes have been assembled and secured together the two rim sections 2 are assembled with the outer ends of the spokes received in the pockets formed by the coöperating depressions and are secured together and to the spokes by welded areas extending through the depressed portions of the flanges and the flattened ends of the spokes, as shown clearly in the drawing. This welding operation is conveniently performed in successive stages in a manner similar to that practised in welding the hub to the spokes. In order to additionally strengthen the rim portion of the wheel and secure a better union between the two sections of the rim the rim flanges are secured at points between the ends of the spokes by welded areas indicated at 35. It will be noted from an inspection of the drawings that the welded areas 35 are located between the ends of the spokes and in close proximity to the base of the flange, thus effectually securing the two sections of the rim together and preventing any tendency to spread the rim apart due to the pressure of air within a pneumatic tire which is applied to the rim.

The invention having been described, what is claimed is:—

1. A method of making metal wheels which comprises forming a rim portion in two parts each having an annular flange with recesses pressed therein, assembling the two rim portions and spokes with the ends of the spokes received in pockets formed by opposing recesses, and welding the ends of the spokes and rim portions together by welded areas extending through the flanges and ends of the spokes.

2. A method of making metal wheels which comprises forming a rim portion in two parts each having an annular flange with recesses pressed therein, forming a spoke with a flattened end, assembling the two rim portions and spokes with the flattened ends of the spokes received in the pockets formed by opposing recesses, and welding the flattened ends of the spokes and rim portions together.

3. A method of making metal wheels which comprises forming a rim portion in two parts each having an annular flange with recesses pressed therein to form narrow, flat pockets when the parts are assembled, forming spokes with flattened ends, assembling the rim portions and spokes with the flattened ends of the spokes received in the narrow flat pockets, and welding the ends of the spokes and rim portions together by welded areas extending through the flanges and flattened ends of the spokes.

4. A method of making a metal wheel which comprises forming a rim portion in two parts each having an annular flange with recesses pressed therein to form pockets when the two parts are assembled having narrow flat end portions and round mouth portions, assembling the rim portions and tubular spokes having flattened ends with the flattened ends of the spokes received in the flattened portions of the pockets, and short lengths of the tubular shanks received and supported in the round mouth portions of the pockets, and welding the ends of the spokes and rim portions together by welded areas extending through the flattened ends of the spokes and metal of the pocket walls.

5. A method of making a metal wheel which comprises bending a bar of angle metal into circular shape and butt welding the ends to form a ring of L-shaped cross section, pressing recesses in the flange of the ring, and welding the ends of spokes to the flange by welded areas extending through the recessed portions of the flanges and the ends of the spokes.

6. A method of making a metal wheel which comprises forming a rim portion in two parts each having an annular flange with recesses pressed therein, assembling the rim portions and spokes with the ends of the spokes received in pockets formed by opposing recesses, welding the ends of the spokes and rim portions together by welded areas extending through the recessed portions of the flanges and ends of the spokes, and welded areas extending through the flanges between the ends of the spokes and in close proximity to the base of the flanges.

7. A method of making a metal wheel which comprises forming a hub portion in a plurality of parts each having an annular flange with recesses pressed therein to form pockets when the hub is assembled, assembling the hub and spokes with the ends of the spokes received in pockets formed by the opposing recesses, and welding the ends of the spokes and parts of the hub together by welded areas extending through the recessed portions of the flanges and ends of the spokes.

8. A method of making a metal wheel which comprises forming a central barrel with oppositely disposed annular flanges having recesses pressed therein, forming end pieces with annular flanges having recesses pressed therein, assembling the central barrel and end pieces with the spokes having their ends received in pockets formed by the opposing recesses, and welding the spokes to the barrel and end pieces by welded areas extending through the recessed portions of the flanges and ends of the spokes.

9. A method of making a metal wheel which comprises forming a hub portion in a plurality of parts each having an annular flange with recesses pressed therein, forming a rim portion in a plurality of parts each having an annular flange with recesses pressed therein, assembling the parts of the hub and spokes with the ends of the spokes received in pockets formed by the opposing recesses, welding the ends of the spokes and parts of the hub together, assembling the parts of the rim with the spokes having their outer ends received in the pockets formed by opposing recesses, and welding the outer ends of the spokes and parts of the rim together.

10. A method of making a metal wheel which comprises forming a central barrel with oppositely disposed annular flanges having recesses pressed therein, the recesses formed in one flange being offset with relation to the recesses formed in the opposite flange, forming end pieces each provided with an annular flange having recesses pressed therein, assembling the several parts of the hub with the ends of spokes received in the pockets formed by the opposing recesses, and welding the ends of the spokes and parts of the hub together.

11. A method of making a metal wheel which comprises forming two members provided with coöperating annular flanges having recesses pressed therein, forming spokes with flattened ends, assembling the two members with the flanges contacting with one another and with the flattened ends of the spokes received in pockets formed by opposing recesses, and welding the members and spokes together by welded areas extending through the recessed portions of the flanges and flattened ends of the spokes.

ARTHUR M. STANLEY.